US012480309B2

(12) United States Patent
Krevor

(10) Patent No.: US 12,480,309 B2
(45) Date of Patent: Nov. 25, 2025

(54) ROOFING SHINGLES WITH FIRE RETARDANT STRUCTURE

(71) Applicant: GAF Energy LLC, Parsippany, NJ (US)

(72) Inventor: David Henry Krevor, San Carlos, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 19/172,932

(22) Filed: Apr. 8, 2025

(65) Prior Publication Data

US 2025/0320722 A1 Oct. 16, 2025

Related U.S. Application Data

(60) Provisional application No. 63/632,360, filed on Apr. 10, 2024.

(51) Int. Cl.
*E04D 1/30* (2006.01)
*H02S 20/25* (2014.01)

(52) U.S. Cl.
CPC ................ *E04D 1/30* (2013.01); *H02S 20/25* (2014.12); *E04D 2001/308* (2013.01)

(58) Field of Classification Search
CPC ....... E04D 1/30; E04D 2001/308; E04D 1/28; E04D 1/265; E04D 2001/005; E04D 2001/305; H02S 20/25
See application file for complete search history.

(56) References Cited

U.S. PATENT DOCUMENTS 1,981,467 A 11/1934 Radtke
3,156,497 A 11/1964 Lessard
(Continued)

FOREIGN PATENT DOCUMENTS

CA 2829440 A 5/2019
CH 700095 A2 6/2010
(Continued)

OTHER PUBLICATIONS

Sunflare, Procducts: "Sunflare Develops Prototype for New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Babajide A Demuren
(74) *Attorney, Agent, or Firm* — GREENBERG TRAURIG, LLP

(57) ABSTRACT

A system includes a photovoltaic module installed on a roof deck, where the photovoltaic module comprises at least one solar cell; and a roofing shingle installed on the roof deck adjacent to the photovoltaic module, where the roofing shingles does not include a solar cell, where the roofing shingle includes a top surface and a bottom surface opposite the top surface, where the bottom surface of the roofing shingle is proximate to the roof deck, where the top surface of the roofing shingle is exposed to an external environment, where the top surface of the roofing shingle includes a first section and a second section, and where the first section is configured to change appearance in response to exposure to a predetermined temperature.

18 Claims, 2 Drawing Sheets

(56) References Cited

U.S. PATENT DOCUMENTS

| | | | |
|---|---|---|---|
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |
| 4,636,577 | A | 1/1987 | Peterpaul |
| 5,167,579 | A | 12/1992 | Rotter |
| 5,437,735 | A | 8/1995 | Younan et al. |
| 5,590,495 | A | 1/1997 | Bressler et al. |
| 5,642,596 | A | 7/1997 | Waddington |
| 6,008,450 | A | 12/1999 | Ohtsuka et al. |
| 6,033,270 | A | 3/2000 | Stuart |
| 6,046,399 | A | 4/2000 | Kapner |
| 6,201,180 | B1 | 3/2001 | Meyer et al. |
| 6,220,329 | B1 | 4/2001 | King et al. |
| 6,308,482 | B1 | 10/2001 | Strait |
| 6,320,114 | B1 | 11/2001 | Kuechler |
| 6,320,115 | B1 | 11/2001 | Kataoka et al. |
| 6,336,304 | B1 | 1/2002 | Mimura et al. |
| 6,341,454 | B1 | 1/2002 | Koleoglou |
| 6,407,329 | B1 | 6/2002 | Iino et al. |
| 6,576,830 | B2 | 6/2003 | Nagao et al. |
| 6,928,781 | B2 | 8/2005 | Desbois et al. |
| 6,972,367 | B2 | 12/2005 | Federspiel et al. |
| 7,138,578 | B2 | 11/2006 | Komamine |
| 7,155,870 | B2 | 1/2007 | Almy |
| 7,178,295 | B2 | 2/2007 | Dinwoodie |
| 7,487,771 | B1 | 2/2009 | Eiffert et al. |
| 7,587,864 | B2 | 9/2009 | McCaskill et al. |
| 7,678,990 | B2 | 3/2010 | McCaskill et al. |
| 7,678,991 | B2 | 3/2010 | McCaskill et al. |
| 7,748,191 | B2 | 7/2010 | Podirsky |
| 7,819,114 | B2 | 10/2010 | Augenbraun et al. |
| 7,824,191 | B1 | 11/2010 | Podirsky |
| 7,832,176 | B2 | 11/2010 | McCaskill et al. |
| 8,118,109 | B1 | 2/2012 | Hacker |
| 8,168,880 | B2 | 5/2012 | Jacobs et al. |
| 8,173,889 | B2 | 5/2012 | Kalkanoglu et al. |
| 8,210,570 | B1 | 7/2012 | Railkar et al. |
| 8,276,329 | B2 | 10/2012 | Lenox |
| 8,312,693 | B2 | 11/2012 | Cappelli |
| 8,319,093 | B2 | 11/2012 | Kalkanoglu et al. |
| 8,333,040 | B2 | 12/2012 | Shiao et al. |
| 8,371,076 | B2 | 2/2013 | Jones et al. |
| 8,375,653 | B2 | 2/2013 | Shiao et al. |
| 8,404,967 | B2 | 3/2013 | Kalkanoglu et al. |
| 8,410,349 | B2 | 4/2013 | Kalkanoglu et al. |
| 8,418,415 | B2 | 4/2013 | Shiao et al. |
| 8,438,796 | B2 | 5/2013 | Shiao et al. |
| 8,468,754 | B2 | 6/2013 | Railkar et al. |
| 8,468,757 | B2 | 6/2013 | Krause et al. |
| 8,505,249 | B2 | 8/2013 | Geary |
| 8,512,866 | B2 | 8/2013 | Taylor |
| 8,513,517 | B2 | 8/2013 | Kalkanoglu et al. |
| 8,586,856 | B2 | 11/2013 | Kalkanoglu et al. |
| 8,601,754 | B2 | 12/2013 | Jenkins et al. |
| 8,629,578 | B2 | 1/2014 | Kurs et al. |
| 8,646,228 | B2 | 2/2014 | Jenkins |
| 8,656,657 | B2 | 2/2014 | Livsey et al. |
| 8,671,630 | B2 | 3/2014 | Lena et al. |
| 8,677,702 | B2 | 3/2014 | Jenkins |
| 8,695,289 | B2 | 4/2014 | Koch et al. |
| 8,713,858 | B1 | 5/2014 | Xie |
| 8,713,860 | B2 | 5/2014 | Railkar et al. |
| 8,733,038 | B2 | 5/2014 | Kalkanoglu et al. |
| 8,776,455 | B2 | 7/2014 | Azoulay |
| 8,789,321 | B2 | 7/2014 | Ishida |
| 8,793,940 | B2 | 8/2014 | Kalkanoglu et al. |
| 8,793,941 | B2 | 8/2014 | Bosler et al. |
| 8,826,607 | B2 | 9/2014 | Shiao et al. |
| 8,835,751 | B2 | 9/2014 | Kalkanoglu et al. |
| 8,863,451 | B2 | 10/2014 | Jenkins et al. |
| 8,898,970 | B2 | 12/2014 | Jenkins et al. |
| 8,925,262 | B2 | 1/2015 | Railkar et al. |
| 8,943,766 | B2 | 2/2015 | Gombarick et al. |
| 8,946,544 | B2 | 2/2015 | Jabos et al. |
| 8,950,128 | B2 | 2/2015 | Kalkanoglu et al. |
| 8,959,848 | B2 | 2/2015 | Jenkins et al. |
| 8,966,838 | B2 | 3/2015 | Jenkins |
| 8,966,850 | B2 | 3/2015 | Jenkins et al. |
| 8,994,224 | B2 | 3/2015 | Mehta et al. |
| 9,032,672 | B2 | 5/2015 | Livsey et al. |
| 9,121,178 | B2 | 9/2015 | Belt et al. |
| 9,153,950 | B2 | 10/2015 | Yamanaka et al. |
| 9,166,087 | B2 | 10/2015 | Chihlas et al. |
| 9,169,646 | B2 | 10/2015 | Rodrigues et al. |
| 9,170,034 | B2 | 10/2015 | Bosler et al. |
| 9,178,465 | B2 | 11/2015 | Shiao et al. |
| 9,202,955 | B2 | 12/2015 | Livsey et al. |
| 9,212,832 | B2 | 12/2015 | Jenkins |
| 9,217,584 | B2 | 12/2015 | Kalkanoglu et al. |
| 9,270,221 | B2 | 2/2016 | Zhao |
| 9,273,885 | B2 | 3/2016 | Rodrigues et al. |
| 9,276,141 | B2 | 3/2016 | Kalkanoglu et al. |
| 9,331,224 | B2 | 5/2016 | Koch et al. |
| 9,356,174 | B2 | 5/2016 | Duarte et al. |
| 9,359,014 | B1 | 6/2016 | Yang et al. |
| 9,412,890 | B1 | 8/2016 | Meyers |
| 9,528,270 | B2 | 12/2016 | Jenkins et al. |
| 9,605,432 | B1 | 3/2017 | Robbins |
| 9,711,672 | B2 | 7/2017 | Wang |
| 9,755,573 | B2 | 9/2017 | Livsey et al. |
| 9,786,802 | B2 | 10/2017 | Shiao et al. |
| 9,831,818 | B2 | 11/2017 | West |
| 9,912,284 | B2 | 3/2018 | Svec |
| 9,923,515 | B2 | 3/2018 | Rodrigues et al. |
| 9,938,729 | B2 | 4/2018 | Coon |
| 9,991,412 | B2 | 6/2018 | Gonzalez et al. |
| 9,998,067 | B2 | 6/2018 | Kalkanoglu et al. |
| 10,027,273 | B2 | 7/2018 | West et al. |
| 10,115,850 | B2 | 10/2018 | Rodrigues et al. |
| 10,128,660 | B1 | 11/2018 | Apte et al. |
| 10,156,075 | B1 | 12/2018 | McDonough |
| 10,187,005 | B2 | 1/2019 | Rodrigues et al. |
| 10,256,765 | B2 | 4/2019 | Rodrigues et al. |
| 10,284,136 | B1 | 5/2019 | Mayfield et al. |
| 10,454,408 | B2 | 10/2019 | Livsey et al. |
| 10,530,292 | B1 | 1/2020 | Cropper et al. |
| 10,560,048 | B2 | 2/2020 | Fisher et al. |
| 10,563,406 | B2 | 2/2020 | Kalkanoglu et al. |
| D879,031 | S | 3/2020 | Lance et al. |
| 10,579,028 | B1 | 3/2020 | Jacob |
| 10,784,813 | B2 | 9/2020 | Kalkanoglu et al. |
| D904,289 | S | 12/2020 | Lance et al. |
| 11,012,026 | B2 | 5/2021 | Kalkanoglu et al. |
| 11,085,187 | B2 | 8/2021 | Grubka et al. |
| 11,177,639 | B1 | 11/2021 | Nguyen et al. |
| 11,217,715 | B2 | 1/2022 | Sharenko et al. |
| 11,251,744 | B1 | 2/2022 | Bunea et al. |
| 11,258,399 | B2 | 2/2022 | Kalkanoglu et al. |
| 11,283,394 | B2 | 3/2022 | Perkins et al. |
| 11,309,828 | B2 | 4/2022 | Sirski et al. |
| 11,394,344 | B2 | 7/2022 | Perkins et al. |
| 11,424,379 | B2 | 8/2022 | Sharenko et al. |
| 11,431,280 | B2 | 8/2022 | Liu et al. |
| 11,431,281 | B2 | 8/2022 | Perkins et al. |
| 11,444,569 | B2 | 9/2022 | Clemente et al. |
| 11,454,027 | B2 | 9/2022 | Kuiper et al. |
| 11,459,757 | B2 | 10/2022 | Nguyen et al. |
| 11,486,144 | B2 | 11/2022 | Bunea et al. |
| 11,489,482 | B2 | 11/2022 | Peterson et al. |
| 11,496,088 | B2 | 11/2022 | Sirski et al. |
| 11,508,861 | B1 | 11/2022 | Perkins et al. |
| 11,512,480 | B1 | 11/2022 | Achor et al. |
| 11,527,665 | B2 | 12/2022 | Boitnott |
| 11,545,927 | B2 | 1/2023 | Abra et al. |
| 11,545,928 | B2 | 1/2023 | Perkins et al. |
| 11,658,470 | B2 | 5/2023 | Nguyen et al. |
| 11,661,745 | B2 | 5/2023 | Bunea et al. |
| 11,689,149 | B2 | 6/2023 | Clemente et al. |
| 11,705,531 | B2 | 7/2023 | Sharenko et al. |
| 11,728,759 | B2 | 8/2023 | Nguyen et al. |
| 11,732,490 | B2 | 8/2023 | Achor et al. |
| 11,811,361 | B1 | 11/2023 | Farhangi et al. |
| 11,824,486 | B2 | 11/2023 | Nguyen et al. |

(56) References Cited

U.S. PATENT DOCUMENTS

| | | | | |
|---|---|---|---|---|
| 11,824,487 | B2 | 11/2023 | Nguyen et al. | |
| 11,843,067 | B2 | 12/2023 | Nguyen et al. | |
| 2002/0053360 | A1 | 5/2002 | Kinoshita et al. | |
| 2002/0129849 | A1 | 9/2002 | Heckeroth | |
| 2003/0101662 | A1 | 6/2003 | Ullman | |
| 2003/0132265 | A1 | 7/2003 | Villela et al. | |
| 2003/0217768 | A1 | 11/2003 | Guha | |
| 2004/0000334 | A1 | 1/2004 | Ressler | |
| 2005/0030187 | A1 | 2/2005 | Peress et al. | |
| 2005/0115603 | A1 | 6/2005 | Yoshida et al. | |
| 2005/0144870 | A1 | 7/2005 | Dinwoodie | |
| 2005/0178428 | A1 | 8/2005 | Laaly et al. | |
| 2005/0193673 | A1 | 9/2005 | Rodrigues et al. | |
| 2006/0042683 | A1 | 3/2006 | Gangemi | |
| 2006/0046084 | A1 | 3/2006 | Yang et al. | |
| 2007/0074757 | A1 | 4/2007 | Mellott et al. | |
| 2007/0181174 | A1 | 8/2007 | Ressler | |
| 2007/0193618 | A1 | 8/2007 | Bressler et al. | |
| 2007/0249194 | A1 | 10/2007 | Liao | |
| 2007/0295385 | A1 | 12/2007 | Sheats et al. | |
| 2008/0006323 | A1 | 1/2008 | Kalkanoglu et al. | |
| 2008/0035140 | A1 | 2/2008 | Placer et al. | |
| 2008/0078440 | A1 | 4/2008 | Lim et al. | |
| 2008/0185748 | A1 | 8/2008 | Kalkanoglu | |
| 2008/0271774 | A1 | 11/2008 | Kalkanoglu et al. | |
| 2008/0289682 | A1 | 11/2008 | Adriani et al. | |
| 2008/0302030 | A1 | 12/2008 | Stancel et al. | |
| 2008/0315061 | A1 | 12/2008 | Fath | |
| 2009/0000222 | A1 | 1/2009 | Kalkanoglu et al. | |
| 2009/0014057 | A1 | 1/2009 | Croft et al. | |
| 2009/0014058 | A1 | 1/2009 | Croft et al. | |
| 2009/0019795 | A1 | 1/2009 | Szacsvay et al. | |
| 2009/0044850 | A1 | 2/2009 | Kimberley | |
| 2009/0114261 | A1 | 5/2009 | Stancel et al. | |
| 2009/0133340 | A1 | 5/2009 | Shiao et al. | |
| 2009/0159118 | A1 | 6/2009 | Kalkanoglu et al. | |
| 2009/0178350 | A1 | 7/2009 | Kalkanoglu et al. | |
| 2009/0229652 | A1 | 9/2009 | Mapel et al. | |
| 2009/0275247 | A1 | 11/2009 | Richter et al. | |
| 2010/0019580 | A1 | 1/2010 | Croft et al. | |
| 2010/0095618 | A1 | 4/2010 | Edison et al. | |
| 2010/0101634 | A1 | 4/2010 | Frank et al. | |
| 2010/0116325 | A1 | 5/2010 | Nikoonahad | |
| 2010/0131108 | A1 | 5/2010 | Meyer | |
| 2010/0139184 | A1 | 6/2010 | Williams et al. | |
| 2010/0146878 | A1 | 6/2010 | Koch et al. | |
| 2010/0159221 | A1 | 6/2010 | Kourtakis et al. | |
| 2010/0170169 | A1 | 7/2010 | Railkar et al. | |
| 2010/0186798 | A1 | 7/2010 | Tormen et al. | |
| 2010/0242381 | A1 | 9/2010 | Jenkins | |
| 2010/0313499 | A1 | 12/2010 | Gangemi | |
| 2010/0325976 | A1 | 12/2010 | DeGenfelder et al. | |
| 2010/0326488 | A1 | 12/2010 | Aue et al. | |
| 2010/0326501 | A1 | 12/2010 | Zhao et al. | |
| 2011/0030761 | A1 | 2/2011 | Kalkanoglu et al. | |
| 2011/0036386 | A1 | 2/2011 | Browder | |
| 2011/0036389 | A1 | 2/2011 | Hardikar et al. | |
| 2011/0048507 | A1 | 3/2011 | Livsey et al. | |
| 2011/0058337 | A1 | 3/2011 | Han et al. | |
| 2011/0061326 | A1 | 3/2011 | Jenkins | |
| 2011/0100436 | A1 | 5/2011 | Cleereman et al. | |
| 2011/0104488 | A1 | 5/2011 | Muessig et al. | |
| 2011/0132427 | A1 | 6/2011 | Kalkanoglu et al. | |
| 2011/0168238 | A1 | 7/2011 | Metin et al. | |
| 2011/0239555 | A1 | 10/2011 | Cook et al. | |
| 2011/0302859 | A1 | 12/2011 | Crasnianski | |
| 2011/0314753 | A1 | 12/2011 | Farmer et al. | |
| 2012/0034799 | A1 | 2/2012 | Hunt | |
| 2012/0060434 | A1 | 3/2012 | Jacobs | |
| 2012/0060902 | A1 | 3/2012 | Drake | |
| 2012/0085392 | A1 | 4/2012 | Albert et al. | |
| 2012/0137600 | A1 | 6/2012 | Jenkins | |
| 2012/0176077 | A1 | 7/2012 | Oh et al. | |
| 2012/0212065 | A1 | 8/2012 | Cheng et al. | |
| 2012/0233940 | A1 | 9/2012 | Perkins et al. | |
| 2012/0240490 | A1 | 9/2012 | Gangemi | |
| 2012/0260977 | A1 | 10/2012 | Stancel | |
| 2012/0266942 | A1 | 10/2012 | Komatsu et al. | |
| 2012/0279150 | A1 | 11/2012 | Pislkak et al. | |
| 2012/0282437 | A1 | 11/2012 | Clark et al. | |
| 2012/0291373 | A1* | 11/2012 | Ewing ....................... | E04D 1/20<br>252/586 |
| 2012/0291848 | A1 | 11/2012 | Sherman et al. | |
| 2013/0008499 | A1 | 1/2013 | Verger et al. | |
| 2013/0014455 | A1 | 1/2013 | Grieco | |
| 2013/0022774 | A1 | 1/2013 | Kalkanoglu et al. | |
| 2013/0118558 | A1 | 5/2013 | Sherman | |
| 2013/0193769 | A1 | 8/2013 | Mehta et al. | |
| 2013/0247988 | A1 | 9/2013 | Reese et al. | |
| 2013/0284267 | A1 | 10/2013 | Plug et al. | |
| 2013/0306137 | A1 | 11/2013 | Ko | |
| 2014/0090697 | A1 | 4/2014 | Rodrigues et al. | |
| 2014/0150843 | A1 | 6/2014 | Pearce et al. | |
| 2014/0173997 | A1 | 6/2014 | Jenkins | |
| 2014/0179220 | A1 | 6/2014 | Railkar et al. | |
| 2014/0182222 | A1 | 7/2014 | Kalkanoglu et al. | |
| 2014/0208675 | A1 | 7/2014 | Beerer et al. | |
| 2014/0254776 | A1 | 9/2014 | O'Connor et al. | |
| 2014/0266289 | A1 | 9/2014 | Della Sera et al. | |
| 2014/0311556 | A1 | 10/2014 | Feng et al. | |
| 2014/0352760 | A1 | 12/2014 | Haynes et al. | |
| 2014/0366464 | A1 | 12/2014 | Rodrigues et al. | |
| 2015/0089895 | A1 | 4/2015 | Leitch | |
| 2015/0162459 | A1 | 6/2015 | Lu et al. | |
| 2015/0340516 | A1 | 11/2015 | Kim et al. | |
| 2015/0349173 | A1 | 12/2015 | Morad et al. | |
| 2016/0105144 | A1 | 4/2016 | Haynes et al. | |
| 2016/0142008 | A1 | 5/2016 | Lopez et al. | |
| 2016/0229968 | A1* | 8/2016 | Mallorey .................. | E04D 1/22 |
| 2016/0254776 | A1 | 9/2016 | Rodrigues et al. | |
| 2016/0276508 | A1 | 9/2016 | Huang et al. | |
| 2016/0359451 | A1 | 12/2016 | Mao et al. | |
| 2017/0159292 | A1 | 6/2017 | Chihlas et al. | |
| 2017/0179319 | A1 | 6/2017 | Yamashita et al. | |
| 2017/0179726 | A1 | 6/2017 | Garrity et al. | |
| 2017/0237390 | A1 | 8/2017 | Hudson et al. | |
| 2017/0331415 | A1 | 11/2017 | Koppi et al. | |
| 2018/0094438 | A1 | 4/2018 | Wu et al. | |
| 2018/0097472 | A1 | 4/2018 | Anderson et al. | |
| 2018/0115275 | A1 | 4/2018 | Flanigan et al. | |
| 2018/0254738 | A1 | 9/2018 | Yang et al. | |
| 2018/0294765 | A1 | 10/2018 | Friedrich et al. | |
| 2018/0351502 | A1 | 12/2018 | Almy et al. | |
| 2018/0367089 | A1 | 12/2018 | Stutterheim et al. | |
| 2019/0030867 | A1 | 1/2019 | Sun et al. | |
| 2019/0081436 | A1 | 3/2019 | Onodi et al. | |
| 2019/0123679 | A1 | 4/2019 | Rodrigues et al. | |
| 2019/0253022 | A1 | 8/2019 | Hardar et al. | |
| 2019/0305717 | A1 | 10/2019 | Allen et al. | |
| 2020/0109320 | A1 | 4/2020 | Jiang | |
| 2020/0144958 | A1 | 5/2020 | Rodrigues et al. | |
| 2020/0220819 | A1 | 7/2020 | Vu et al. | |
| 2020/0224419 | A1 | 7/2020 | Boss et al. | |
| 2020/0343397 | A1 | 10/2020 | Hem-Jensen | |
| 2021/0083619 | A1 | 3/2021 | Hegedus | |
| 2021/0115223 | A1 | 4/2021 | Bonekamp et al. | |
| 2021/0159353 | A1 | 5/2021 | Li et al. | |
| 2021/0301536 | A1 | 9/2021 | Baggs et al. | |
| 2021/0343886 | A1 | 11/2021 | Sharenko et al. | |
| 2022/0060141 | A1 | 2/2022 | Felton | |
| 2022/0149213 | A1 | 5/2022 | Mensink et al. | |
| 2023/0258369 | A1* | 8/2023 | Clemente ................ | F24S 25/70<br>52/173.3 |
| 2024/0018781 | A1 | 1/2024 | Sirski et al. | |
| 2024/0291427 | A1 | 8/2024 | Perkins et al. | |

FOREIGN PATENT DOCUMENTS

| | | | |
|---|---|---|---|
| CN | 202797032 | U | 3/2013 |
| CN | 209224637 | U | 8/2019 |
| CN | 217150978 | U | 8/2022 |
| DE | 1958248 | A1 | 11/1971 |
| EP | 1039361 | A1 | 9/2000 |
| EP | 1837162 | A1 | 9/2007 |

(56) References Cited

FOREIGN PATENT DOCUMENTS

| | | | |
|---|---|---|---|
| EP | 1774372 | A1 | 7/2011 |
| EP | 2446481 | A2 | 5/2012 |
| EP | 2784241 | A1 | 10/2014 |
| EP | 3772175 | A1 | 2/2021 |
| JP | 10046767 | A | 2/1998 |
| JP | 2002-106151 | A | 4/2002 |
| JP | 2001-098703 | A | 10/2002 |
| JP | 2017-027735 | A | 2/2017 |
| JP | 2018053707 | A | 4/2018 |
| KR | 20090084060 | A | 8/2009 |
| KR | 10-1348283 | B1 | 1/2014 |
| KR | 10-2019-0000367 | A | 1/2019 |
| KR | 10-2253483 | B1 | 5/2021 |
| NL | 2026856 | B1 | 6/2022 |
| WO | 2010/151777 | A2 | 12/2010 |
| WO | 2011/049944 | A1 | 4/2011 |
| WO | 2015/133632 | A1 | 9/2015 |
| WO | 2018/000589 | A1 | 1/2018 |
| WO | 2019/201416 | A1 | 10/2019 |
| WO | 2020-159358 | A1 | 8/2020 |
| WO | 2021-247098 | A1 | 12/2021 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

ROOFING SHINGLES WITH FIRE RETARDANT STRUCTURE

CROSS-REFERENCE TO RELATED APPLICATION

This application is a Section 111(a) application relating to and claiming the benefit of commonly owned, U.S. Provisional Patent Application Ser. No. 63/632,360, filed Apr. 10, 2024, entitled "ROOFING SYSTEM INCLUDING PHOTOVOLTAIC MODULES AND ROOFING SHINGLES," the contents of which is incorporated herein by reference in its entirety.

FIELD

The present invention is directed to a roofing system, and, more specifically, to a roofing system that includes a photovoltaic module and a roofing shingle.

BACKGROUND

In a known roofing system, a plurality of photovoltaic modules as well a plurality of roofing shingles are installed on a roof deck.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a system, comprising: a roof deck; a photovoltaic module installed on the roof deck, wherein the photovoltaic module includes at least one solar cell; and a roofing shingle installed on the roof deck adjacent to the photovoltaic module, wherein the roofing shingle does not include a solar cell, wherein the roofing shingle includes a top surface and a bottom surface opposite the top surface, wherein the bottom surface of the roofing shingle is proximate to the roof deck, wherein the top surface of the roofing shingle is exposed to an external environment, wherein the top surface of the roofing shingle includes a first section and a second section, wherein the first section is configured to change appearance in response to exposure to a predetermined temperature.

In some embodiments, the first section is configured to change color in response to exposure to the predetermined temperature.

In some embodiments, the first section is configured to change size in response to exposure to the predetermined temperature.

In some embodiments, the first section is configured to change texture in response to exposure to the predetermined temperature.

In some embodiments, the first section is configured to change shape in response to exposure to the predetermined temperature.

In some embodiments, the first section comprises an intumescent material.

In some embodiments, the first section comprises expandable graphite.

In some embodiments, the first section is configured to change appearance so as to be visually discernible from a ground surface, after exposure to the predetermined temperature.

In some embodiments, the first section extends from one end of the top surface of the roofing shingle to another end of the top surface of the roofing shingle.

In some embodiments, a boundary between the first section and the second section is not visually discernible before exposure to the predetermined temperature.

In some embodiments, the present invention provides a system, comprising: a roof deck; and a roofing shingle installed on the roof deck, wherein the roofing shingle does not include a solar cell, wherein the roofing shingle includes a top surface and a bottom surface opposite the top surface, wherein the bottom surface of the roofing shingle is proximate to the roof deck, wherein the top surface of the roofing shingle is exposed to an external environment, wherein the top surface of the roofing shingle includes a first section and a second section, wherein the first section is configured to change appearance in response to exposure to a predetermined temperature, and wherein the second section is configured to maintain a same appearance when exposed to the predetermined temperature.

In some embodiments, the first section is configured to change color in response to exposure to the predetermined temperature.

In some embodiments, the first section is configured to change size in response to exposure to the predetermined temperature.

In some embodiments, the first section is configured to change texture in response to exposure to the predetermined temperature.

In some embodiments, the first section is configured to change shape in response to exposure to the predetermined temperature.

In some embodiments, the first section comprises an intumescent material.

In some embodiments, the first section comprises expandable graphite.

In some embodiments, the first section is configured to change appearance so as to be visually discernible from a ground surface, when exposed to the predetermined temperature.

In some embodiments, the first section extends from one end of the top surface of the roofing shingle to another end of the top surface of the roofing shingle.

In some embodiments, a boundary between the first section and the second section is not visually discernible before exposure to the predetermined temperature.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION

Figure 2:
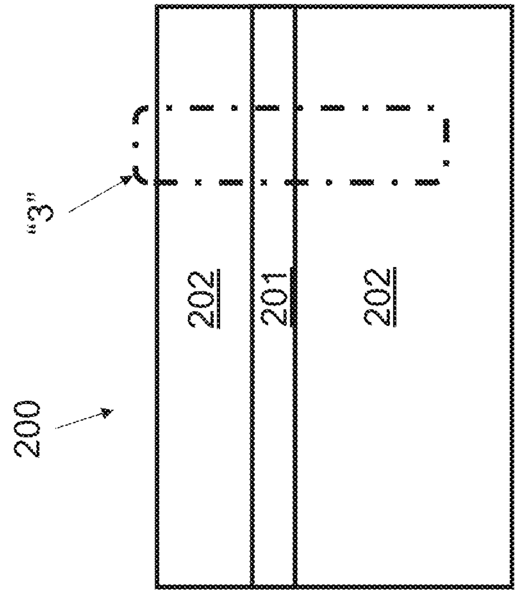
FIG. 2 is a top schematic view of one of the roofing shingles of FIG. 1, in accordance with some embodiments of the invention.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the Specification, including the Detailed Description and Claims, the following terms take the meanings explicitly associated herein, unless the context dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," "with," and any similar phrase or phrases, do not limit the scope of a specific claim to the materials or steps recited by the claim.

As used herein, a "steep slope" roof or roof deck is a roof or roof deck that has a pitch of Y/X, where Y and X are in a ratio of 4:12 to 20:12, where Y corresponds to the "rise" of the roof or roof deck, and where X corresponds to the "run" of the roof or roof deck.

As used herein, a "sloped" roof or roof deck is a roof or roof deck that has a pitch greater than zero (that is, the roof or roof deck is not flat), but the pitch is less than that of a steep slope roof or roof deck.

In some embodiments, a roofing system includes at least one photovoltaic module or roofing shingle installed on a roof deck. In some embodiments, the photovoltaic modules includes at least one solar cell. In some embodiments, one or more of the photovoltaic modules includes a structure, composition, component, and/or function similar to those of one or more embodiments of the photovoltaic modules and photovoltaic shingles disclosed, shown, and/or described in any or all of: U.S. application Ser. No. 17/831,307, filed Jun. 2, 2022, titled "Roofing Module System," and published under U.S. Patent Application Publication No. 2022-0393637 on Dec. 8, 2022; U.S. application Ser. No. 18/169,718, filed Feb. 15, 2023, titled "Roofing Module System," and published under U.S. Patent Application Publication No. 2023-0203815 on Jun. 29, 2023; PCT International Patent Publication No. WO 2022/051593, Application No. PCT/US2021/049017, published Mar. 10, 2022, titled "Building Integrated Photovoltaic System," owned by GAF Energy LLC; and/or U.S. Pat. No. 11,251,744 to Bunea et al., issued Feb. 15, 2022, titled "Photovoltaic Shingles and Methods of Installing Same"; and the disclosures of each of which are incorporated by reference herein in their entireties, with certain different and/or additional features as described herein.

In some embodiments, one or more of the roofing shingles does not include a solar cell. In some embodiments, the roofing shingle is a cuttable roofing module. In some embodiments, the roofing shingle includes a structure, composition, component, and/or function similar to those of one or more embodiments of a non-photovoltaic module, roofing shingle, and/or another roofing material disclosed, shown, and/or described in either or both of U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023; and/or U.S. application Ser. No. 18/352,894, filed Jul. 14, 2023, titled "Solar Roofing System with Fiber Composite Roofing Shingles," and the disclosures of each of which are incorporated by reference herein in their entireties, with certain different and/or additional features as described herein.

In some embodiments, one or more (e.g., a plurality of) photovoltaic modules are installed adjacent one or more (e.g., a plurality of) roofing shingles on the roof deck.

In some embodiments, the roof deck is a steep slope roof deck.

In some embodiments, the roof deck is a sloped roof deck.

In some embodiments, at least one of the roofing shingles includes a top surface, and a bottom surface opposite the top surface. In some embodiments, the bottom surface is proximate to the roof deck. In some embodiments, the top surface is exposed to an external environment. In some embodiments, the top surface is an uppermost or topmost surface of the roofing shingle when installed or after installation on the roof deck.

In some embodiments, the top surface of the roofing shingle includes a section configured to change appearance in response to (e.g., during and/or after) a predetermined temperature. In some embodiments, the top surface includes a first section and a second section. In some embodiments, the first section is configured to change appearance in response to exposure to a predetermined temperature. In some embodiments, the second section comprises a plurality of sections. In some embodiments, the second sections at least partially surround the first section.

In some embodiments, the first section is configured to change color in response and/or after exposure to the predetermined temperature. In some embodiments, the change in color is to become lighter in color. In some embodiments, the change in color is to become darker in color. In some embodiments, to become lighter in color includes a color changing from a relatively lower L* value in the CIELAB color space to a relatively higher L* value. In some embodiments, to become darker in color includes a color changing from a relatively higher L* value to a relatively lower L* value.

In some embodiments, the first section is configured to change size in response and/or after exposure to the predetermined temperature. In some embodiments, the change in size is a change in one or more, or all of, or none of, a change in length, width, and/or height. In some embodiments, the change in size is a contraction of one or more areas, volumes, and/or sections of the roofing shingle. In some embodiments, the change in size is an expansion in one or more areas, volumes, and/or section of the roofing shingle.

In some embodiments, the change in size is a change of at least 1 cm in at least one dimension. In some embodiments, the change in size is a change of at least 2 cm in at least one dimension. In some embodiments, the change in size is a change of at least 3 cm in at least one dimension. In some embodiments, the change in size is a change of at least 4 cm in at least one dimension. In some embodiments, the change in size is a change of at least 5 cm in at least one dimension. In some embodiments, the change in size is a change of at least 6 cm in at least one dimension. In some embodiments, the change in size is a change of at least 7 cm in at least one dimension. In some embodiments, the change in size is a change of at least 8 cm in at least one dimension.

In some embodiments, the first section is configured to change texture in response and/or after exposure to the predetermined temperature. In some embodiments, the change in texture is to become rougher. In some embodiments, to become rougher includes a surface having an increase in size and/or number of ridges, projections, and/or protrusions. In some embodiments, the change in texture is to become smoother. In some embodiments, to become smoother includes a surface having a decrease in size and/or number of ridges, projections, and/or protrusions.

In some embodiments, the first section is configured to change shape in response and/or after exposure to the predetermined temperature.

In some embodiments, the first section includes an intumescent material. In some embodiments, the intumescent material includes graphite. In some embodiments, the first section includes an expandable material. In some embodiments, the intumescent material includes expandable graphite.

In some embodiments, the first section is configured to change appearance so as to be visually discernible from a ground surface, in response and/or after exposure to the predetermined temperature. In some embodiments, the ground surface is a surface on which the structure that includes the roof deck is located (e.g., the surface of the building lot). In some embodiments, the first section is configured to change appearance so as to be visually discernible from the roof surface in response and/or after exposure to the predetermined temperature, without the first section being visually discernable from the ground surface before and/or after exposure.

In some embodiments, the first section extends from one end of the top surface of the roofing shingle to another end of the top surface of the roofing shingle. In some embodiments, the first section extends from a location spaced apart from one end of the top surface of the roofing shingle to another end of the top surface of the roofing shingle.

In some embodiments, the second section is configured to change appearance in response and/or after exposure to the predetermined temperature. In some embodiments, the second section is configured to change appearance in response and/or after exposure to the predetermined temperature, as described with respect to the first section. In some embodiments, the second section is configured not to change appearance (e.g., is configured to maintain the same appearance) in response and/or after exposure to the predetermined temperature.

In some embodiments, the second section is at least one second section that is on one area of the roofing shingle. In some embodiments, the second section is two or more second sections on two or more areas of the roofing shingle, such as on two or more of sides of the first section.

In some embodiments, a boundary between the first section and the second section is not visually discernible before exposure to the predetermined temperature. In some embodiments, the boundary is not visually discernible from the ground surface but is visually discernable from the roof surface before exposure to the predetermined temperature. In some embodiments, the boundary between the first section and the second section is visually discernible from the ground surface before exposure to the predetermined temperature.

In some embodiments, the top surface of the roofing shingle includes the first section and the second section. In some embodiments, the first section is configured to change appearance in response and/or after exposure to the predetermined temperature, and the second section is configured to maintain the same appearance (e.g., not to change appearance) in response and/or after exposure to the predetermined temperature.

In some embodiments, the predetermined temperature is less than 220 degrees Celsius. In some embodiments, the predetermined temperature is 220 degrees Celsius. In some embodiments, the predetermined temperature is 230 degrees Celsius. In some embodiments, the predetermined temperature is 240 degrees Celsius. In some embodiments, the predetermined temperature is 250 degrees Celsius. In some embodiments, the predetermined temperature is 260 degrees Celsius. In some embodiments, the predetermined temperature is 270 degrees Celsius. In some embodiments, the predetermined temperature is 280 degrees Celsius. In some embodiments, the predetermined temperature is greater than 280 degrees Celsius.

In some embodiments, the predetermined temperature is 220 degrees Celsius to 280 degrees Celsius. In some embodiments, the predetermined temperature is 230 degrees Celsius to 280 degrees Celsius. In some embodiments, the predetermined temperature is 240 degrees Celsius to 280 degrees Celsius. In some embodiments, the predetermined temperature is 250 degrees Celsius to 280 degrees Celsius.

In some embodiments, the predetermined temperature is 220 degrees Celsius to 270 degrees Celsius. In some embodiments, the predetermined temperature is 230 degrees Celsius to 270 degrees Celsius. In some embodiments, the predetermined temperature is 240 degrees Celsius to 270 degrees Celsius.

In some embodiments, the predetermined temperature is 220 degrees Celsius to 260 degrees Celsius. In some embodiments, the predetermined temperature is 230 degrees Celsius to 260 degrees Celsius.

In some embodiments, the predetermined temperature is 220 degrees Celsius to 250 degrees Celsius.

In some embodiments, the first section configured to change appearance in response and/or after exposure to the predetermined temperature is on a top surface of the roofing shingle (e.g., an uppermost or top surface of the roofing shingle when installed or after installation on the roof deck). In some embodiments, the first section is on a bottom surface of the roofing shingle (e.g., a lowermost or bottom surface of the roofing shingle when installed or after installation on the roof deck). In some embodiments, the first section is on a headlap portion of the roofing shingle. In some embodiments, the first section is on a reveal portion of the roofing shingle. In some embodiments, the first section is observable without moving another roofing shingle installed on the roof deck (e.g., the first section is not covered by another roofing shingle). In some embodiments, the first section is not observable until moving another roofing shingle installed on the roof deck (e.g., the first section is covered by at least a portion of another roofing shingle). In some embodiments, the roofing shingle is formed by an injection molding process. In some embodiments, the first section of the roofing shingle is formed by an injection molding process. In some embodiments, the first section of the roofing shingle is formed with the second section by an injection molding process.

In some embodiments, the roofing shingle is formed by an extrusion process. In some embodiments, the first section of the roofing shingle is formed by an extrusion process. In some embodiments, the first section of the roofing shingle is formed with the second section by an extrusion process—e.g., in some embodiments, the first section is coextruded with the second section of the roofing shingle.

In some embodiments, the first section is on a photovoltaic module that includes a solar cell. In some embodiments, the first section is on a top surface of the photovoltaic module (e.g., an uppermost or top surface of the photovoltaic module when installed or after installation on the roof deck). In some embodiments, the first section is on a bottom surface of the photovoltaic module (e.g., a lowermost or bottom surface of the photovoltaic module when installed or after installation on the roof deck). In some embodiments, the first section is on a headlap portion of the photovoltaic module. In some embodiments, the first section is on a reveal portion of the photovoltaic module. In some embodiments, the first section is on a sidelap portion of the roofing shingle. In some embodiments, the first section is observable without moving another roofing shingle or photovoltaic module installed on the roof deck (e.g., the first section is not covered by another roofing shingle or photovoltaic module). In some embodiments, the first section is not observable until moving another roofing shingle or photovoltaic module installed on the roof deck (e.g., the first section is covered by at least a portion of another roofing shingle or photovoltaic module).

In some embodiments, the first section is above a jumper module of the photovoltaic module. In some embodiments, the jumper module includes a structure, composition, component, and/or function similar to those of one or more embodiments of the jumper module disclosed, shown, and/or described in U.S. application Ser. No. 17/858,618, filed Jul. 6, 2022, titled "Jumper Module for Photovoltaic Systems," the disclosures of which is incorporated by reference herein in its entirety, with any different and/or additional features as described herein. In some embodiments, the first section is below the jumper module. In some embodiments, the first section is adjacent the jumper module.

In some embodiments, the first section is above a power optimizer of the photovoltaic module. In some embodiments, the first section is below the power optimizer. In some embodiments, the first section is adjacent the power optimizer.

In some embodiments, the first section is above an electronics module associated with the photovoltaic module. In some embodiments, the first section is below the electronics module. In some embodiments, the first section is adjacent the electronics module.

In some embodiments, "below" includes a bottom surface of the roofing shingle or photovoltaic module. In some embodiments, "above" includes a top surface of the roofing shingle or photovoltaic module.

In some embodiments, the roofing shingle or photovoltaic module includes a fire retardant. In some embodiments, the first portion includes a fire retardant. In some embodiments, the second portion include a fire retardant. In some embodiments, the only fire retardant in the roofing shingle or photovoltaic module is in the first portion. In some embodiments, the only fire retardant is the intumescent material in the first portion. In some embodiments, the first portion retards the spread of a fire on the roof deck.

In some embodiments, the first section is above a top surface of a frontsheet of the photovoltaic module. In some embodiments, the first section is below the top surface of the frontsheet of the photovoltaic module.

In some embodiments, the first portion is part of another roofing component other than a roofing shingle or photovoltaic module. In some embodiments, the roofing component is one or more of a membrane, a ridge vent, and/or another roofing component, and the roofing component includes the first portion as described herein.

Figure 1:
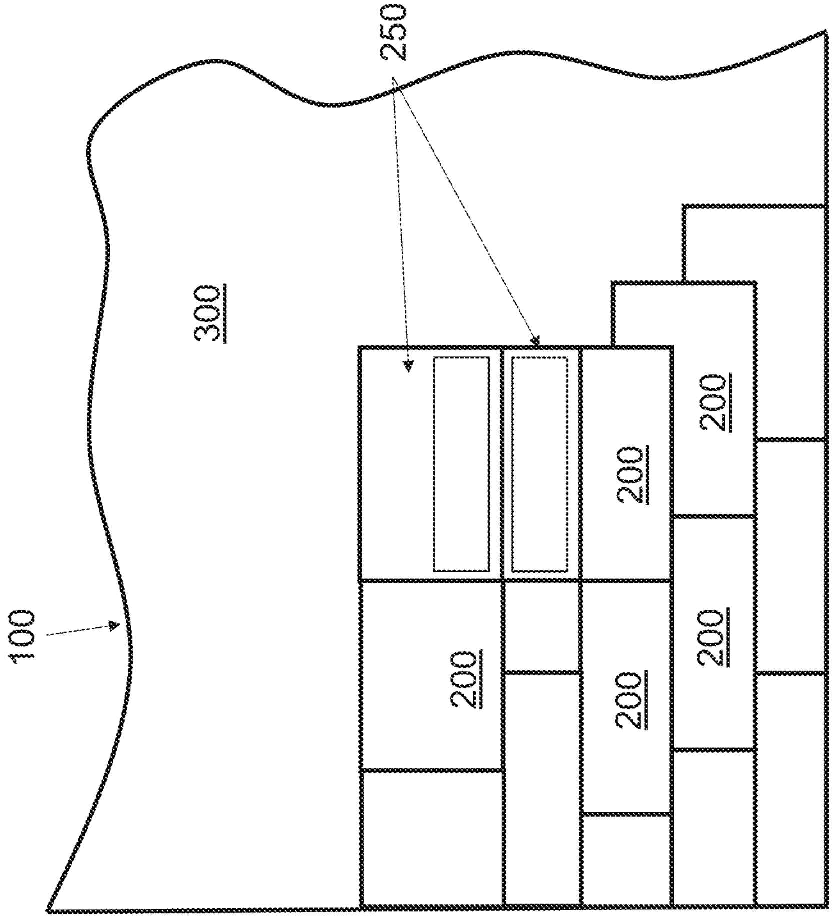
FIG. 1 is a top schematic view of a roofing system including a plurality of photovoltaic modules and a plurality of roofing shingles installed on a roof deck, in accordance with some embodiments of the invention.

With reference to the drawings, FIG. 1 is a top schematic view of a roofing system 100 including a plurality of roofing shingles 200 and a plurality of photovoltaic modules 250 installed on a roof deck 300, and FIG. 2 is a top schematic view of one of the roofing shingles 200 of FIG. 1.

Figure 3A:
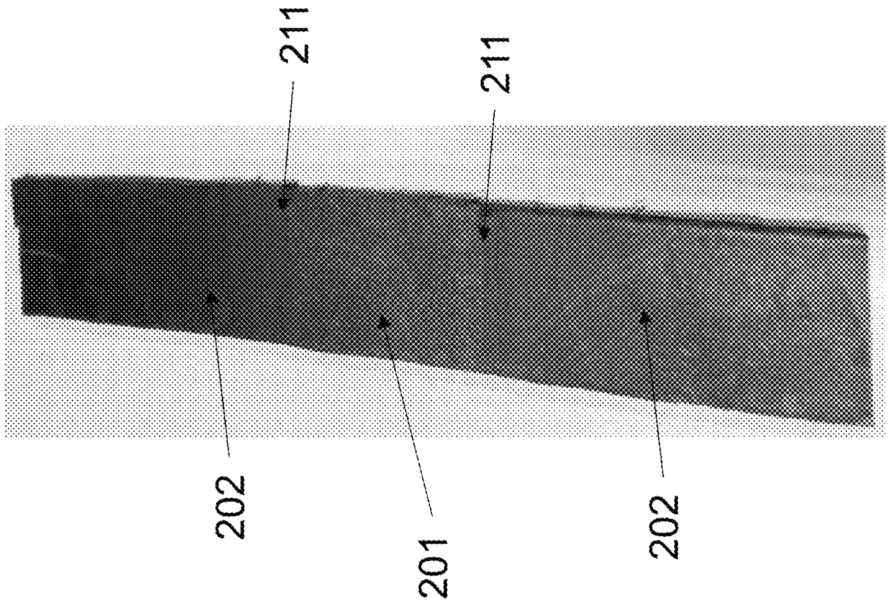
FIG. 3A is a photograph of a portion of the roofing shingles of FIG. 2, before exposure to the predetermined temperature, in accordance with some embodiments of the invention.
Figure 3B:
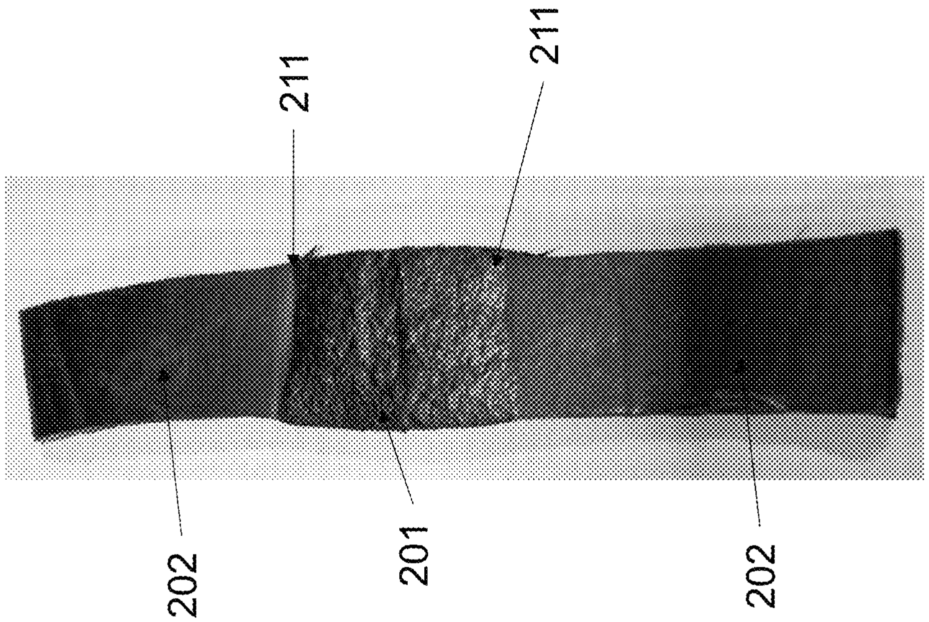
FIG. 3B is a photograph of the roofing shingles of FIG. 3A, after exposure to the predetermined temperature, in accordance with some embodiments of the invention.

With further reference to the figures, FIG. 3A is a photograph of a portion of one of the roofing shingles 200 taken from box "3" in FIG. 2, which includes a first section 201 that is configured to change appearance in response and/or after exposure to the predetermined temperature, and at least one second section 202 that is configured to maintain the same appearance in response and/or after exposure to the predetermined temperature, before the roofing shingle 200 is exposed to the predetermined temperature; while FIG. 3B is a photograph of the first section 201 and the second section 202 after exposure of the roofing shingle 200 to the predetermined temperature, such that the first section 201 has changed appearance, in accordance with some embodiments of the invention.

In some embodiments, as FIG. 2 shows, the roofing shingle 200 includes the first section 201. In some embodiments, the first section 201 of the roofing shingle 200 is configured to change appearance in response and/or after exposure to the predetermined temperature, as described. As the figure also shows, in some embodiments, the roofing shingle 200 includes the plurality of the second sections 202. In some embodiments, the second sections 202 are configured not to change appearance (e.g., the second sections 202 are configured to maintain the same appearance) after exposure to the predetermined temperature. In some embodiments, as shown in the figures, the plurality of second sections 202 includes two second sections 202, on opposite sides of the first section 201, the two second sections 202 on the same surface of the roofing shingle 200 as the first section 201.

In some embodiments, as FIGS. 3A and 3B shown, one or more boundaries 211 between the first section 201 and the second section 212 are not visually discernible before exposure to the predetermined temperature, but are discernible in response and/or after exposure to the predetermined temperature.

In some embodiments, as FIG. 2 shows, the first section 201 extends to one or more edges or ends of the roofing shingle 200. In some embodiments, the first section 201 extends from locations spaced apart from one or more edges or ends of the roofing shingle 200 (e.g., ends of the first section 201 are spaced apart from ends or edges of the roofing shingle 200). In some embodiments, the first section 201 extends substantially along a length of the roofing shingle 200 (e.g., such that when the roofing shingle 200 is installed on the roof deck, the first section 201 extends substantially along or parallel to an eave of the roof deck 300). In some embodiments, the first section 201 extends substantially along a height of the roofing shingle (e.g., such that when the roofing shingle 200 is installed on the roof deck, the first section 201 extends substantially along or parallel to a rake of the roof deck 300).

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A system, comprising:
a roof deck;
a photovoltaic module installed on the roof deck,
wherein the photovoltaic module comprises at least one solar cell; and
a roofing shingle installed on the roof deck adjacent to the photovoltaic module,
wherein the roofing shingle does not include a solar cell,
wherein the roofing shingle includes a top surface and a bottom surface opposite the top surface,
wherein the bottom surface of the roofing shingle is proximate to the roof deck,
wherein the top surface of the roofing shingle includes a first section and a second section,
wherein the first section and the second section are on an exposed portion of the top surface, and
wherein the first section is configured to change appearance in response to exposure to a predetermined temperature and
wherein a boundary between the first section and the second section is not visually discernible before exposure to the predetermined temperature.

2. The system of claim 1, wherein the first section is configured to change color in response to exposure to the predetermined temperature.

3. The system of claim 1, wherein the first section is configured to change size in response to exposure to the predetermined temperature.

4. The system of claim 1, wherein the first section is configured to change texture in response to exposure to the predetermined temperature.

5. The system of claim 1, wherein the first section is configured to change shape in response to exposure to the predetermined temperature.

6. The system of claim 1, wherein the first section comprises an intumescent material.

7. The system of claim 1, wherein the first section comprises expandable graphite.

8. The system of claim 1, wherein the first section is configured to change appearance so as to be visually discernible from a ground surface, after exposure to the predetermined temperature.

9. The system of claim 1, wherein the first section extends from one end of the top surface of the roofing shingle to another end of the top surface of the roofing shingle.

10. A system, comprising:
a roof deck; and
a roofing shingle installed on the roof deck,
wherein the roofing shingle does not include a solar cell,
wherein the roofing shingle includes a top surface and a bottom surface opposite the top surface,
wherein the bottom surface of the roofing shingle is proximate to the roof deck,
wherein the top surface of the roofing shingle includes a first section and a second section,
wherein the first section and the second section are on an exposed portion of the top surface,
wherein the first section is configured to change appearance in response to exposure to a predetermined temperature, and
wherein the second section is configured to maintain a same appearance when exposed to the predetermined temperature, and
wherein a boundary between the first section and the second section is not visually discernible before exposure to the predetermined temperature.

11. The system of claim 10, wherein the first section is configured to change color in response to exposure to the predetermined temperature.

12. The system of claim 10, wherein the first section is configured to change size in response to exposure to the predetermined temperature.

13. The system of claim 10, wherein the first section is configured to change texture in response to exposure to the predetermined temperature.

14. The system of claim 10, wherein the first section is configured to change shape in response to exposure to the predetermined temperature.

15. The system of claim 10, wherein the first section comprises an intumescent material.

16. The system of claim 10, wherein the first section comprises expandable graphite.

17. The system of claim 10, wherein the first section is configured to change appearance so as to be visually discernible from a ground surface, when exposed to the predetermined temperature.

18. The system of claim 10, wherein the first section extends from one end of the top surface of the roofing shingle to another end of the top surface of the roofing shingle.

* * * * *